(12) United States Patent
Diessner (10) Patent No.: US 12,172,630 B2
(45) Date of Patent: Dec. 24, 2024

(54) TRAILER LEVELLING SYSTEM (71) Applicant: Continental Autonomous Mobility US, LLC, Auburn Hills, MI (US)

(72) Inventor: Horst Daniel Diessner, Rochester Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 94 days.

(21) Appl. No.: 17/650,384

(22) Filed: Feb. 9, 2022

(65) Prior Publication Data

US 2023/0249673 A1   Aug. 10, 2023

(51) Int. Cl.
*B60W 30/02* (2012.01)
*B60D 1/46* (2006.01)
(Continued)

(52) U.S. Cl.
CPC .............. *B60W 30/02* (2013.01); *B60D 1/46* (2013.01); *B60G 17/016* (2013.01); *B60W 10/22* (2013.01); *B60W 40/11* (2013.01); *B60W 40/112* (2013.01); *G06T 7/62* (2017.01); *G06T 7/73* (2017.01); *B60G 2300/04* (2013.01); *B60G 2400/0511* (2013.01); *B60G 2500/30* (2013.01); *B60W 2300/14* (2013.01); *B60W 2420/403* (2013.01); *B60W 2520/16* (2013.01); *B60W 2520/18* (2013.01); *B60W 2530/201* (2020.02); *B60W 2540/215* (2020.02);
(Continued)

(58) Field of Classification Search
CPC .......... B60D 1/46; B60D 1/36; B60G 17/016; B60G 2300/04; B60G 2400/0511; B60G 2500/30; B60G 2500/14; B60W 40/11; B60W 40/112; B60W 2420/42; G06T 7/62; G06T 7/73
See application file for complete search history.

(56) References Cited

U.S. PATENT DOCUMENTS

2012/0041659 A1* 2/2012 Greene ................... B60D 1/30
701/70
2014/0200759 A1* 7/2014 Lu ........................... G06T 7/246
701/28
(Continued)

FOREIGN PATENT DOCUMENTS

DE    102012018914 A1    3/2014
DE    102012022807 A1    5/2014
(Continued)

OTHER PUBLICATIONS

The International Search Report and the Written Opinion of the International Searching Authority mailed on May 24, 2023 for the counterpart PCT Application No. PCT/US2023/062218.

*Primary Examiner* — George C Jin (57) ABSTRACT

A method includes calculating, at a data processing hardware, a relative angle between a tow vehicle and a trailer attached to the tow vehicle. An absolute angle of the tow vehicle is determined at the data processing hardware. An absolute angle of the trailer based on the relative angle and the absolute angle of the tow vehicle is calculated at the data processing hardware. A dimension of the trailer is determined at the data processing hardware. A trailer leveling adjustment based on the absolute angle of the trailer and the dimension of the trailer is calculated at the data processing hardware.

22 Claims, 7 Drawing Sheets

(51) Int. Cl.
  *B60G 17/016* (2006.01)
  *B60W 10/22* (2006.01)
  *B60W 40/11* (2012.01)
  *B60W 40/112* (2012.01)
  *G06T 7/62* (2017.01)
  *G06T 7/73* (2017.01)

(52) U.S. Cl.
  CPC ..... *B60W 2720/16* (2013.01); *B60W 2720/18* (2013.01); *G06T 2207/30252* (2013.01)

(56) References Cited

U.S. PATENT DOCUMENTS

2022/0063720 A1* 3/2022 Oh .................. B60D 1/245
2022/0366186 A1* 11/2022 Sriram ............... G06N 3/084

FOREIGN PATENT DOCUMENTS

EP      1026057 A1   8/2000
WO   2018037224 A1   3/2018

\* cited by examiner

TRAILER LEVELLING SYSTEM

BACKGROUND

The present disclosure relates to a trailer leveling system that aids in leveling a trailer about its transverse axis (corresponding to a pitch angle) and its fore-aft axis (corresponding to a roll angle).

Trailers are usually unpowered vehicles that are pulled by a powered tow vehicle. In certain situations, it is desirable for a trailer to be level when parked. For example, it is desirable for a camping trailer to be levelled in a campsite where the ground may be slanted or uneven.

Typically, the roll angle of a trailer has been levelled manually by adding boards or blocks of varying height under the trailer's tires. Similarly, the pitch angle of a trailer has been levelled by adjusting the height of the trailer's tongue jack and/or adding boards or blocks of varying height under the tongue jack. The leveling of a trailer's roll and pitch angles may be a tedious process of trial and error requiring repetitive cycles of adding or removing height and then measuring with a bubble level until leveling is achieved.

Accordingly, a system that determines an exact amount of height that must be added under a trailers tires and/or tongue jack to level the trailer is desirable.

SUMMARY

In one exemplary embodiment, a method includes calculating, at a data processing hardware, a relative angle between a tow vehicle and a trailer attached to the tow vehicle. An absolute angle of the tow vehicle is determined at the data processing hardware. An absolute angle of the trailer based on the relative angle and the absolute angle of the tow vehicle is calculated at the data processing hardware. A dimension of the trailer is determined at the data processing hardware. A trailer leveling adjustment based on the absolute angle of the trailer and the dimension of the trailer is calculated at the data processing hardware.

In another embodiment according to any of the previous embodiments, the step of calculating the absolute angle of the trailer includes summing the relative angle and the absolute angle of the tow vehicle.

In another embodiment according to any of the previous embodiments, the method further includes receiving, at the data processing hardware, images from a sensor positioned on a rear portion of the tow vehicle. Visual features from the images are determined at the data processing hardware. The visual features are tracked while the tow vehicle and the trailer are moving at the data processing hardware. The step of calculating the relative angle comprises calculating the relative angle based on the visual features.

In another embodiment according to any of the previous embodiments, the step of determining the dimension comprises determining the dimension based on the visual features.

In another embodiment according to any of the previous embodiments, the step of determining a dimension is based on an input by a user to a user interface of the tow vehicle.

In another embodiment according to any of the previous embodiments, the relative angle is a relative pitch angle, $\theta_R$. The absolute angle of the tow vehicle is an absolute pitch angle of the tow vehicle, $\theta_V$. The absolute angle of the trailer is an absolute pitch angle of the trailer, $\theta_T$. The dimension is a trailer length, $L_T$. The trailer leveling adjustment is a trailer tongue height adjustment, $H_P$.

In another embodiment according to any of the previous embodiments, the trailer tongue height adjustment, $H_P$, is calculated as: $H_P = \sin(\theta_T) * L_T$.

In another embodiment according to any of the previous embodiments, the relative angle is a relative roll angle, $\varphi_R$. The absolute angle of the tow vehicle is an absolute roll angle of the tow vehicle, $\varphi_V$. The absolute angle of the trailer is an absolute roll angle of the trailer, $\varphi_T$. The dimension is a trailer width, $W_T$. The trailer leveling adjustment is a wheel height adjustment, $H_R$.

In another embodiment according to any of the previous embodiments, the wheel height adjustment, $H_R$, is calculated as: $H_R = \sin(\varphi_T) * W_T$.

In another embodiment according to any of the previous embodiments, the trailer leveling adjustment is displayed on a user interface of the tow vehicle.

In another embodiment according to any of the previous embodiments, a height under the trailer is adjusted based on the trailer leveling adjustment.

In another exemplary embodiment, a system for determining a trailer leveling adjustment of a trailer includes a sensor. A data processing hardware device is in communication with the sensor and configured to calculate an absolute angle of a trailer based on data obtained by the sensor. The data processing hardware device is further configured to determine a dimension of the trailer and calculate a trailer leveling adjustment based on the absolute angle of the trailer and the dimension of the trailer.

In another embodiment according to any of the previous embodiments, the data processing hardware device is further configured to calculate a relative angle between a tow vehicle and the trailer, the tow vehicle being attached to the trailer. The data processing hardware device is further configured to determine an absolute angle of the tow vehicle, and calculate the absolute angle of the trailer based on the relative angle and the absolute angle of the tow vehicle.

In another embodiment according to any of the previous embodiments, the sensor comprises an imaging sensor mounted to an aft structure of the tow vehicle.

In another embodiment according to any of the previous embodiments, the data processing hardware device is further configured to receive images from the imaging sensor and determine visual features from the images. The data processing hardware device is further configured to track the visual features while the tow vehicle and trailer are moving, and calculate the relative angle based on the visual features.

In another embodiment according to any of the previous embodiments, the data processing hardware device determines the dimension based on the visual features.

In another embodiment according to any of the previous embodiments, the data processing hardware device determines the dimension of the trailer based on an input by a user.

In another embodiment according to any of the previous embodiments, the sensor comprises a smart phone positioned within the trailer.

In one exemplary embodiment, a non-transitory computer readable medium includes instructions executable by a data processing hardware. Instructions are executed by the data processing hardware for calculating a relative angle between a tow vehicle and a trailer attached to the tow vehicle. Instructions are executed by the data processing hardware for determining an absolute angle of the tow vehicle. Instructions are executed by the data processing hardware for calculating an absolute angle of the trailer based on the relative angle and the absolute angle. Instructions executed by the data processing hardware for estimating a dimension of the trailer. Instructions executed by the data processing hardware for calculating a trailer leveling adjustment based on the absolute angle of the trailer and the dimension of the trailer.

In another embodiment according to any of the previous embodiments, instructions are executed by the data processing hardware for receiving images from a sensor positioned on a rear portion of the tow vehicle. Instructions are executed by the data processing hardware for determining visual features from the images. Instructions are executed by the data processing hardware for tracking the visual features while the tow vehicle and trailer are moving. The instructions for calculating a relative angle comprise calculating the relative angle based on the visual features.

BRIEF DESCRIPTION OF THE DRAWINGS

The various features and advantages of the present disclosure will become apparent to those skilled in the art from the following detailed description. The drawings that accompany the detailed description can be briefly described as follows.

DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a vehicle coupler attached to a trailer hitch, e.g., a vehicle tow ball attached to a trailer hitch coupler. Vehicles that include trailer reverse and driving systems detect and utilize an angle between the tow vehicle and the trailer for operation. Further, the angle of the trailer relative to the vehicle may be used to determine leveling adjustments needed to level the trailer on a surface.

Figure 1A:
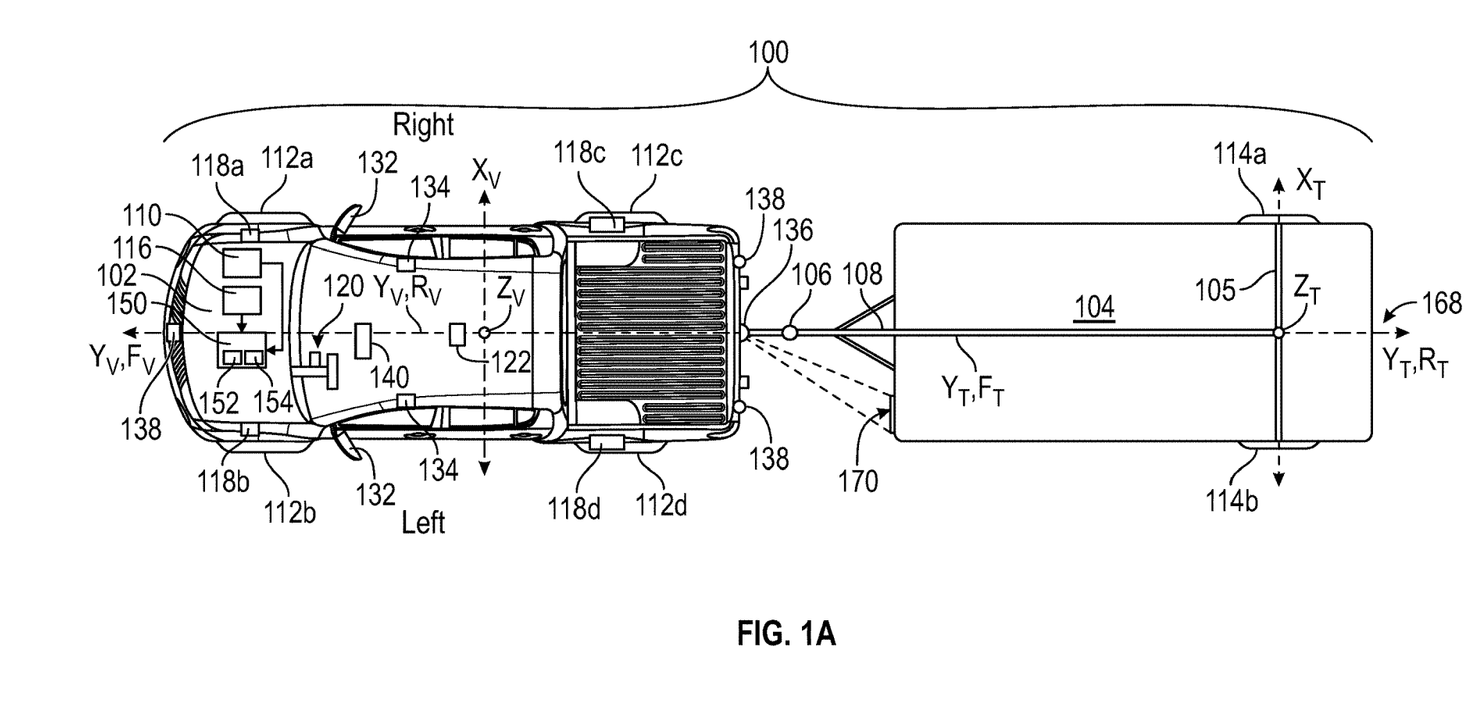
FIG. 1A is a schematic view of an exemplary tow vehicle hitched to a trailer.
Figure 1B:
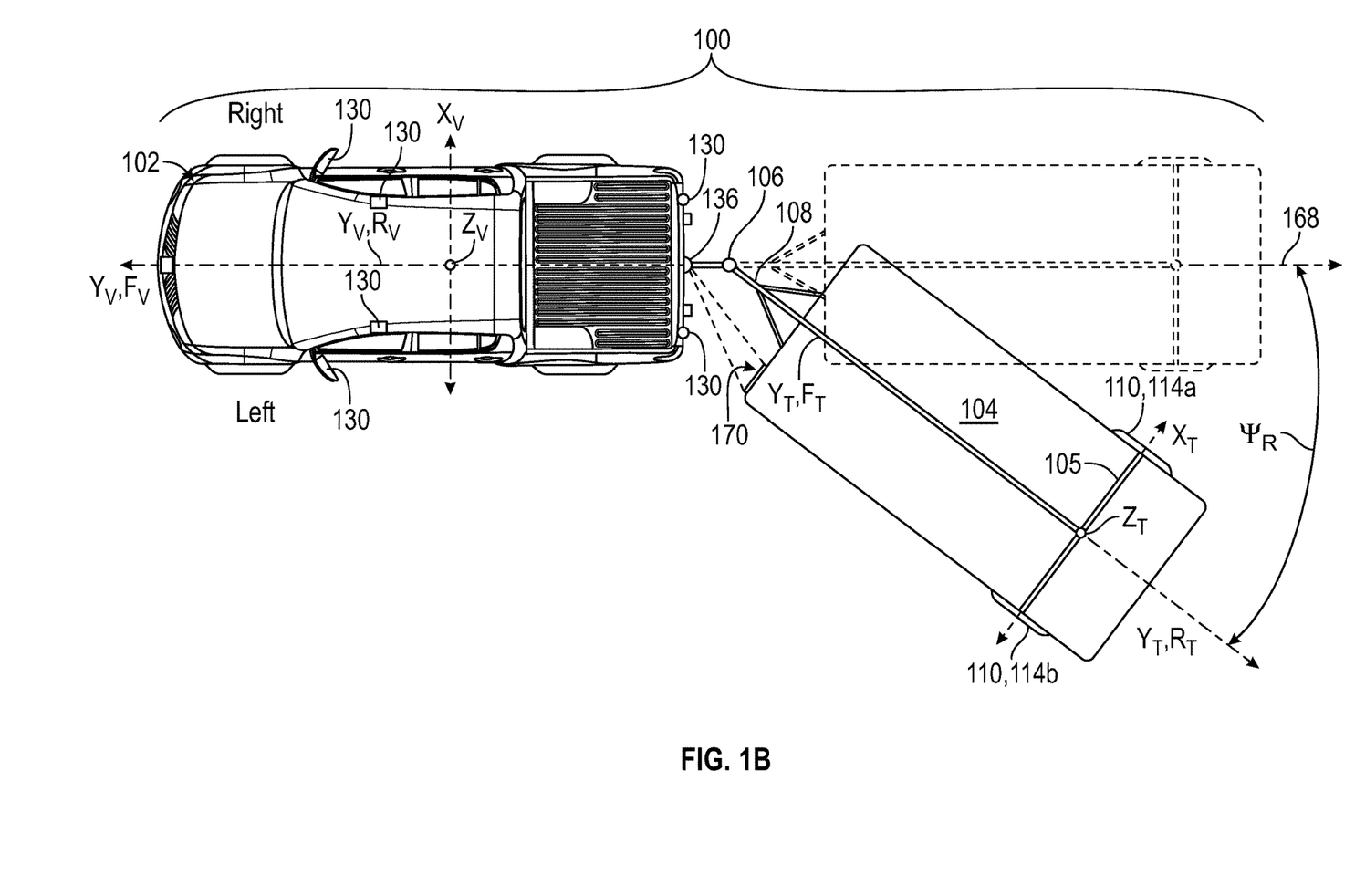
FIG. 1B is a schematic view of the exemplary tow vehicle hitched to the trailer with a yaw angle.
Figure 2:
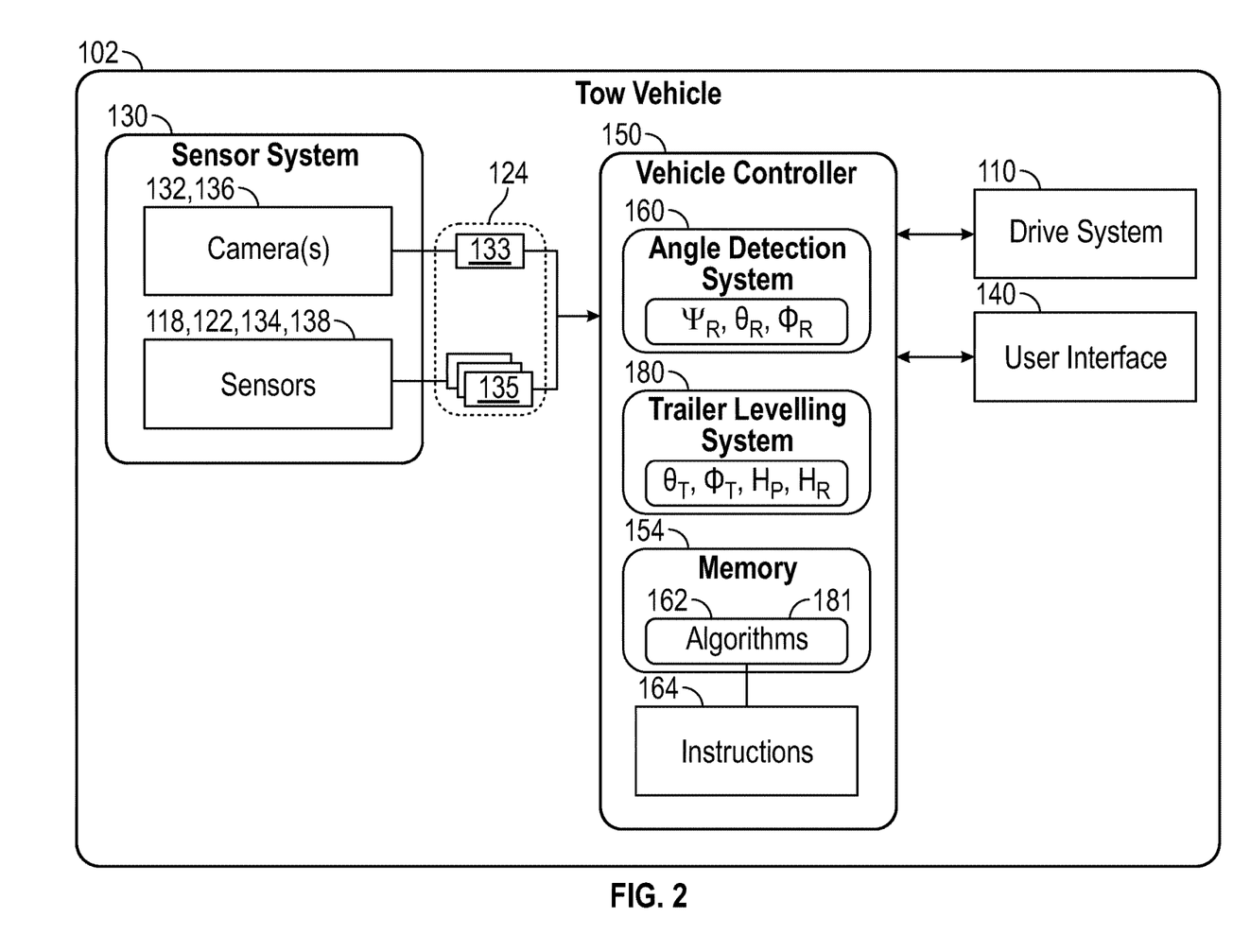
FIG. 2 is a schematic view of the exemplary tow vehicle having an angle detection system and trailer leveling system.

Referring to FIGS. 1A, 1B and 2, in some implementations, a vehicle-trailer system 100 includes a tow vehicle 102 hitched to a trailer 104. The tow vehicle 102 includes a vehicle tow ball attached to a trailer hitch coupler 106 supported by a trailer hitch bar 108 of the trailer 104. The tow vehicle 102 includes a drive system 110 associated with the tow vehicle 102 that maneuvers the tow vehicle 102 and thus the vehicle-trailer system 100 across a road surface based on drive maneuvers or commands having x, y, and z components, for example.

The tow vehicle 102 includes a front right wheel 112a, a front left wheel 112b, a rear right wheel 112c, and a rear left wheel 112d. In addition, the drive system 110 may account for wheels 114a and 114b associated with the trailer 104. The drive system 110 may include other wheel configurations as well. The drive system 110 may include a motor or an engine that converts one form of energy into mechanical energy allowing the vehicle 102 to move. The drive system 110 includes other components (not shown) that are in communication with and connected to the wheels 112a-d and engine and that allow the vehicle 102 to move, thus moving the trailer 104 as well. The drive system 110 may also include a brake system (not shown) that includes brakes associated with each wheel 112a-d, where each brake is associated with a wheel 112a-d and is configured to slow down or stop the wheel 112a-d from rotating. In some examples, the brake system is connected to one or more brakes supported by the trailer 104. The drive system 110 may also include an acceleration system (not shown) that is configured to adjust a speed of the tow vehicle 102 and thus the vehicle-trailer system 100, and a steering system that is configured to adjust a direction of the tow vehicle 102 and thus the vehicle-trailer system 100. The vehicle-trailer system 100 may include other systems as well that are generally indicated at 116.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion.

In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along. While turning, the tow vehicle 102 and the trailer 104 form a relative trailer yaw angle TR.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$ extends between a right side and a left side of the trailer 104 along a trailer turning axle 105. In some examples, the trailer 104 includes a front axle (not shown) and rear axle 105. In this case, the trailer transverse axis $X_T$ extends between a right side and a left side of the trailer 104 along a midpoint of the front and rear axle (i.e., a virtual turning axle). A forward drive direction along the trailer fore-aft axis $Y_T$ is designated as FT, also referred to as a forward motion. In addition, a trailer aft or rearward drive direction along the fore-aft direction $Y_T$ is designated as RT, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. While turning, the tow vehicle 102 and the trailer 104 form the relative trailer yaw angle $\psi_R$ (FIG. 1B) being an angle between the vehicle fore-aft axis $Y_V$ and the trailer fore-aft axis $Y_T$.

Figure 4A:
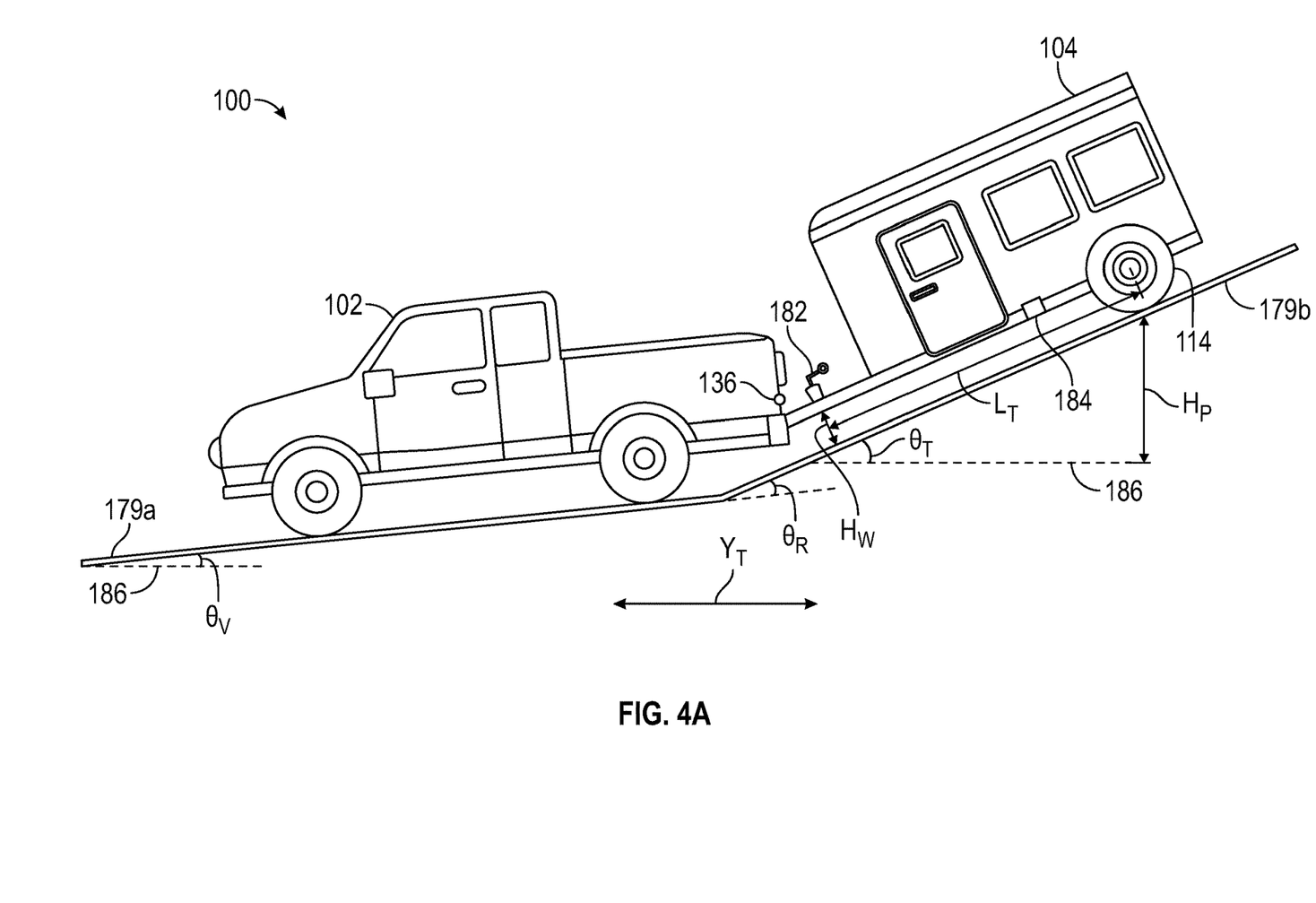
FIG. 4A is a schematic view of the exemplary tow vehicle hitched to the trailer on an angled surface with a pitch angle.
Figure 5A:
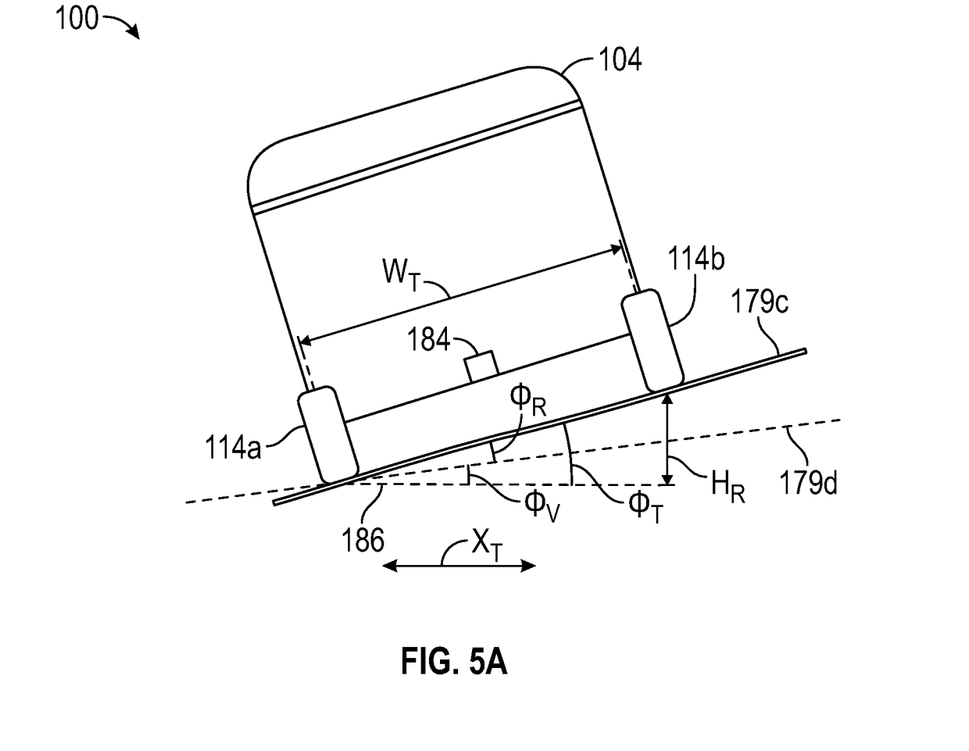
FIG. 5A is a schematic view of the trailer on an angled surface with a roll angle.

In some implementations, the vehicle 102 includes a sensor system 130 to provide sensor system data 124 that may be used to determine one or more measurements, such as, a relative trailer yaw angle $\psi_R$ (FIG. 2), pitch angle $\theta_R$ (FIG. 4), and/or roll angle $\varphi_R$ (FIG. 5). In some examples, the vehicle 102 may be autonomous or semi-autonomous, therefore, the sensor system 130 provides reliable and robust autonomous driving. The sensor system 130 provides sensor system data 124 and may include different types of sensors 118, 120, 134 and 138 that may be used separately or with one another to create a perception of the tow vehicle's environment or a portion thereof that is used by the vehicle-trailer system 100 to identify object(s) in its environment and/or in some examples autonomously drive and make intelligent decisions based on objects and obstacles detected by the sensor system 130. In some examples, the sensor system 130 includes one or more cameras 136 supported by a rear portion of the tow vehicle 102 which provide sensor system data 133 associated with object(s) positioned behind the tow vehicle 102. The tow vehicle 102 may support the sensor system 130; while in other examples, the sensor system 130 is supported by the vehicle 102 and the trailer 104.

The sensor system 130 includes one or more cameras 132, 136 that provide camera data 133. The one or more cameras 132, 136 may include mono-cameras where each position on an image shows a different amount of light, but not a different hue. In some examples, the camera(s) 132, 136 may include a fisheye lens that includes an ultra-wide-angle lens that produces strong visual distortion intended to create a wide panoramic or hemispherical image 133. Fisheye cameras capture images 133 having an extremely wide angle of view. Other types of cameras may also be used to capture images 133 of the vehicle and trailer environment. The camera data 133 may include additional data 133 such as intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in the vehicle's coordinates). In addition, the camera data 133 may include minimum/maximum/average height of the camera 132 with respect to ground (e.g., when the vehicle is loaded and unloaded), and a longitudinal distance between the camera 132 and the tow vehicle hitch ball. In this disclosed example, the cameras 132 are disposed on side view mirrors of the tow vehicle. The camera 136 is disposed on a rear portion of the tow vehicle 102 and provides images of forward facing surfaces of the trailer 104.

The sensor system 130 may include, but is not limited to, radar, sonar, LIDAR (Light Detection and Ranging, which can entail optical remote sensing that measures properties of scattered light to find range and/or other information of a distant target), LADAR (Laser Detection and Ranging), ultrasonic, etc. schematically indicated at 138. The sensor system 130 may further include wheel speed sensors 118a-b disposed at each wheel to provide information indicative of wheel speed at each of the wheels 112a-d. The sensor system 130 may also include a steering sensor 120 that provides information indictive of an orientation of the steering wheels. The sensor system 130 may also include an absolute angle sensor 122 that provides information indicative of a vehicle's absolute pitch angle $\theta_V$ (FIG. 4) or roll angle $\varphi_V$ (FIG. 5). The absolute angle sensor 122 may comprise gyroscopic sensors, cameras, Inertial Measurement Units (IMU), mechanical sensors, LIDAR sensors, radar sensors, ultrasonic sensors, etc. It should be appreciated that other sensing devices may also be provided as part of the example sensing system 130 and are within the scope and contemplation of this disclosure.

The sensor system 130 provides sensor system data 124 that includes one or both of images 133 from the one or more cameras 132, 136 and sensor information 135 from the one or more other sensors 118, 120, 134, and 138. Therefore, the sensor system 130 is especially useful for receiving information of the environment or portion of the environment of the vehicle and for increasing safety in the vehicle-trailer system 100 which may operate by the driver or under semi-autonomous or autonomous conditions. In some implementations, a first camera 132a and a second camera 132b are positioned on each side of the vehicle 102. Additionally, the rear facing third camera 136 may be mounted at the rear of the vehicle 102.

The tow vehicle 102 may include a user interface 140, such as a display. The user interface 140 is configured to display information to the driver. In some examples, the user interface 140 is configured to receive one or more user commands from the driver via one or more input mechanisms or a touch screen display and/or displays one or more notifications to the driver. In some examples, the user interface 140 is a touch screen display. In other examples, the user interface 140 is not a touchscreen and the driver may use an input device, such as, but not limited to, a rotary knob or a mouse to make a selection. In some examples, a trailer parameter detection system 160 instructs the user interface 140 to display one or more trailer parameters.

The user interface 140 is in communication with a vehicle controller 150 that includes a computing device (or data processing hardware) 152 (e.g., central processing unit having one or more computing processors) in communication with non-transitory memory or memory hardware 154 (e.g., a hard disk, flash memory, random-access memory) capable of storing instructions executable on the computing processor(s)). In one example embodiment, the non-transitory memory 154 stores instructions 164 that when executed on the data processing hardware 152 cause the vehicle controller 150 to send a signal to one or more other vehicle systems 110, 116. As shown, the vehicle controller 150 is supported by the tow vehicle 102; however, the vehicle controller 150 may be separate from the tow vehicle 102 and in communication with the tow vehicle 102 via a network (not shown). In addition, the vehicle controller 150 is in communication with the sensor system 130 and receives sensor system data 124 from the sensor system 130. In some examples, the vehicle controller 150 is configured to process sensor system data 124 received from the sensor system 130.

In some implementations, the vehicle controller 150 includes an angle detection system 160 that outputs at least one of a relative trailer yaw angle $\psi_R$, pitch angle $\theta_R$, and roll angle $\varphi_R$. The angle detection system 160 executes an algorithm 162 that estimates the angles $\psi_R/\theta_R/\varphi_R$ of the trailer 104 attached to the vehicle 102. Using projective geometry, the angle detection system 160 estimates the relative angle of vehicle-trailer system 100. In other words, the angle detection system 160 determines the angles $\psi_R/\theta_R/\varphi_R$ between an attached trailer 104 and the two vehicle 102 using the camera 136. In this example the camera 136 is a mono camera and optionally vehicle information such as vehicle steering wheel angle, wheel ticks, vehicle velocity, gear, and/or IMU information.

The angle detection system 160 utilizes features selected from images provided by the rear camera 136 to determine a relative angle of the trailer 104 to the tow vehicle 102 as compared to a determined zero angle. The disclosed angle detection system 160 works for planar and non-planar trailer surfaces by selecting features on camera facing surfaces. The selected features comprise a plurality of points that are within a common or substantially common plane. Accordingly, the example angle detection system 160 uses selected features and points from real time images rather than based on stored images.

Figure 3:
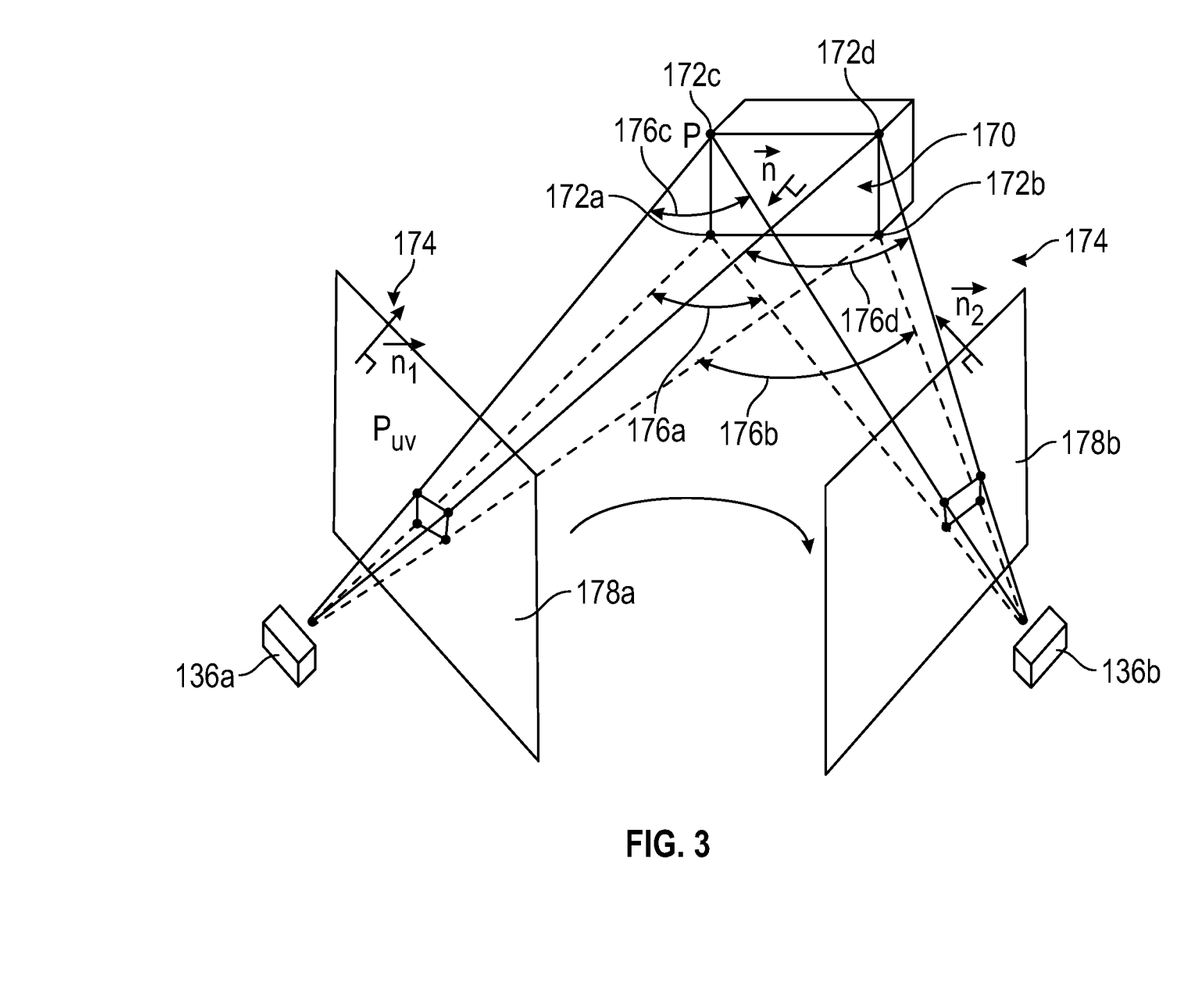
FIG. 3 is an example projective geometry.

Referring to FIG. 3 with continued reference to FIGS. 1A, 1B and 2 the angle detection system 160 executes the algorithm 162 utilizing images 133 from the single camera 136 mounted in the tow vehicle 102 and sensor data 135 such as steering wheel angle, wheel encoders, gear, IMU, etc. received from sensors 118, 120, 134 and 138. FIG. 3 is a schematic representation that illustrates a first position of a camera at 136a and a second position of the camera 136b in relation to the selected portion of the trailer face 170. The camera 136 does not physically move from its location on the tow vehicle 102. Instead, the schematic view shown in FIG. 3 shows a change in the relative orientation of the camera 136 and the portion 170 of the trailer 104 that occurs during a turn or other maneuver.

Information regarding the configuration and specific parameters of the camera 136 such as focal length, image sensor format, and principal point are known.

In operation, the example algorithm 162 is executed by a data processing hardware device such as the example controller 150 to receive images from the camera 136. From those images, visual features 172a-d are selected and generated. FIG. 3 is a schematic representation of the projective geometry utilized to determine the angles $\psi_R/\theta_R/\varphi_R$. In this example, the selected visual features 172a-d are obtained from the images and are within substantially planer portion 170 on the forward facing surface of the trailer 104. The portion 170 need not be centered or in any particular location. The system 160 selects the portion 170 based on the visual features 172a-d being in a best fit plane. The system 160 periodically extracts the visual features from the sequence of images to update the image utilized to determine the angles $\psi_R/\theta_R/\varphi_R$.

Once the features 172a-d are selected a zero angle maneuver is performed to provide a baseline angle from which the yaw, pitch and roll angles $\psi_R/\theta_R/\varphi_R$ are determined. The system 160 computes a zero-angle reference axis 168 with information from the tow vehicle sensor system 130. Th zero-angle reference axis 168 may be calculated by driving the vehicle-trailer system 100 straight until the system 160 is aligned (in zero-angle). When the system 160 is aligned, e.g., after some time driving straight, the algorithm 162 compute the visual reference features 172a-d. The selection and computing of the visual reference features filters out errant and outlying points that are not consistent with the remaining and eventually selected visual features 172a-d. The tow vehicle 102 is determined to be moving straight based on information 135 from the sensors 118, 120, 134 and 138 as well as any other tow vehicle information that is indicative an confirms straight line movement. In this example, the vehicle information includes information such as steering wheel angle from the steering sensor 120, wheel rotation from the wheel speed sensors 118a-d, vehicle velocity, and acceleration as well as any other available information that can be used to increase the robustness of the zero-angle determination. The zero-angle determination is executed automatically and may be periodically updated to maintain and confirm the zero-angle accuracy.

Once the zero-angle axis 168 has been determined and the visual features 170a-d selected, the system 160 tracks those visual features. Tracking of the visual features includes a periodic analysis of the images captured by the camera. The tracking of the visual features may be performed continually or prompted responsive to an indication that the orientation between the tow vehicle 102 and the trailer 104 is changing. During a turning maneuver the visual features 170a-d are tracked.

Tracking of the visual features 172 a-d is performed automatically and provides for the angle calculations required to determine the trailer angles $\psi_R/\theta_R/\varphi_R$.

Given the initial zero-angle determination and the current features, a Homography matrix is computed using projective geometry. At least 4 of the visual features 172a-d are utilized to complete the Homography matrix. The homography matrix is 3×3 matrix that relates the transformation between two planes.

The front face of a trailer 104 may or may not be planar. The system 160 generalizes the front of the trailer for locally planar surfaces such as the portion 170. The portion 170 is defined by the visual features 172 a-d in a planar or nearly planar surface.

To obtain features that belong to a locally planar surface, the system computes the Homography matrix for different subsets of matches among the visible features 172a-d. The Homography matrices that don't have a sufficient predefined amount of feature matches related to it are not utilized. To determine what features matches are related to a Homography matrix, the system utilizes methods such as a Least Squares optimization, Random Sample Consensus (RANSAC), Support Vector Machine (SVN), Least-Median robust method, along with other known statistical parameters for verifying applicable features. Filtering the features that are not compatible with the selected Homography matrices prior the trailer's angle calculation reduces the reprojection error. An optimization method such as gradient descent, Levenberg-Marquardt, or other known method may also be utilized to refine the calculated Homography matrices.

Once the visual features 172a-d are determined for a Homography matrix, the Homography matrix provides four (4) solutions. The two solutions with negative translations are discarded. A rotation matrix is extracted from the remaining positive solutions. The rotation matrix provides a value that represents a spacial rotation between the initial position given by the zero-angle determination and a current position of the trailer 104.

The rotation matrix gives the relative trailer yaw, pitch and roll angles $\psi_R/\theta_R/\varphi_R$ by looking at the system's geometry given by a normal of the plane $\vec{n}$ 174 and the normal of the camera frames 178 a, b. The angle between the two planes 178a and 178b in the yaw, pitch, and roll directions is determined for each of the Homography matrices found from visual features 172 a-d and a solution is determined based on a predefined criterion. The criteria may be an average of the angles and/or a median value of the angles 176a-b corresponding to each of the visual features 172a-b.

The vehicle controller 150 further includes a trailer leveling system 180. The trailer leveling system 180 executes an algorithm 181 that outputs a trailer absolute pitch angle $\theta_T$ and roll angle $\varphi_T$. The trailer leveling system 180 also outputs trailer leveling adjustments that may be required under certain locations of the trailer 104, such as under a trailer tongue jack 182 or trailer wheels 114, to level the trailer 104 on an uneven of slanted surface. A user may initiate the trailer leveling system 180 on the user interface 140 of the tow vehicle 102, and the outputs of the trailer leveling system 180 may be displayed on the user interface 140. By utilizing the trailer leveling system 180 a user is informed of an exact height that must be achieved under the tongue jack 182 and wheels 114 without the need for a tedious trial and error process. The trailer leveling system 180 may also update constantly to provide real-time outputs as a user levels the trailer 104.

FIG. 4A illustrates a side view of the vehicle-trailer system 100 with the tow vehicle 102 on a first surface 179a angled in the fore-aft direction $Y_T$ and trailer 104 on a second surfaces 179b angled in fore-aft direction $Y_T$. The tow vehicle 102 and trailer 104 form the relative pitch angle $\theta_R$.

The tow vehicle 102 has a vehicle absolute pitch angle $\theta_V$ on the angled surface 179a. The absolute pitch angle $\theta_V$ may be determined by the absolute angle sensor 122 and communicated to the vehicle control 150. The trailer 104 also has a trailer absolute pitch angle 8T on the angled surface 179b. The trailer hitch bar 106 (or tongue) is spaced from the angled surface 179b by the wheels 114 of the trailer 104 at a height $H_W$.

Figure 4B:
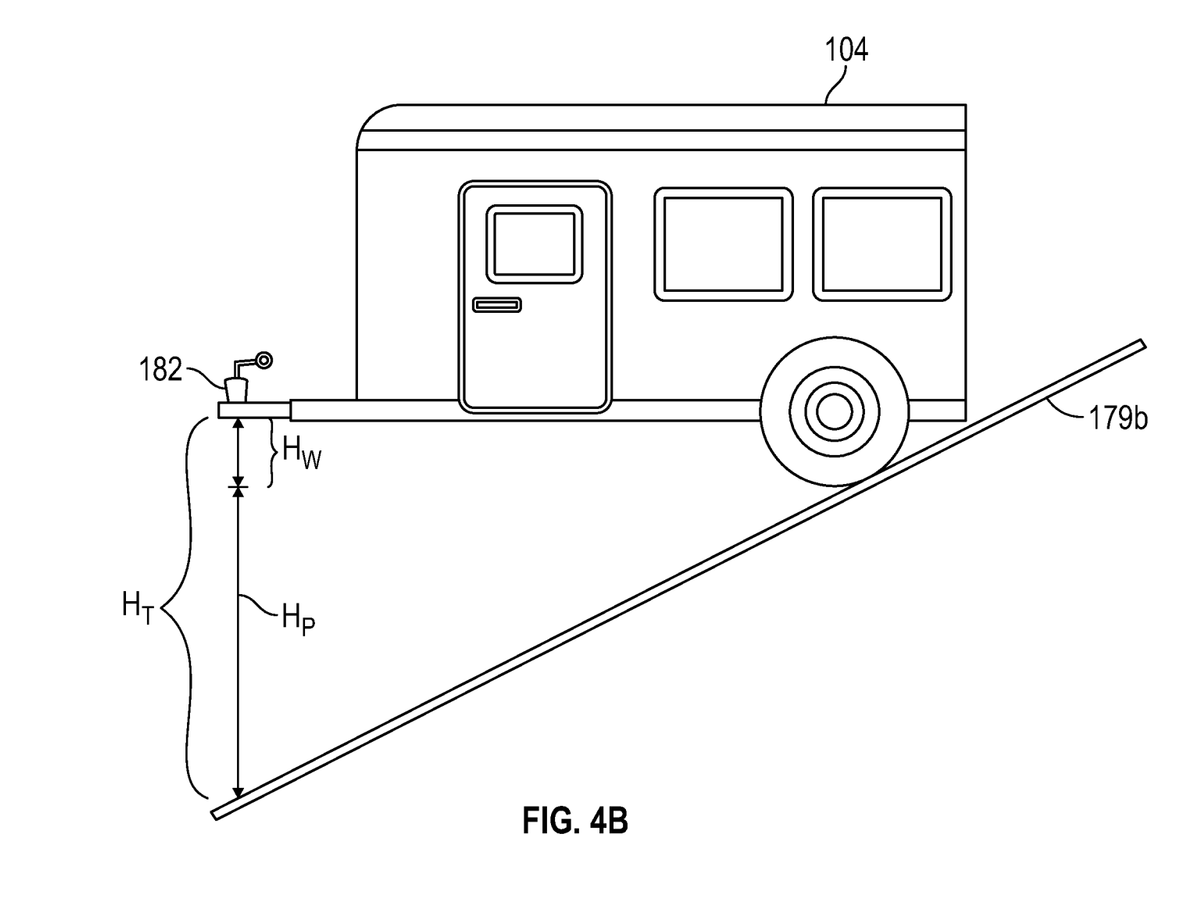
FIG. 4B is a schematic view of the trailer levelled on the angled surface of FIG. 4A.

The trailer leveling system 180 in this example determines a trailer tongue height adjustment $H_P$ that must be achieved under the trailer tongue jack 182 for the trailer 104 to be level in the pitch direction (FIG. 4B).

In one example, to determine the height $H_P$, the algorithm 181 of the trailer leveling system 180 first uses the following equation to determine the trailer absolute pitch angle $\theta_T$:

$$\theta_T = \theta_V + \theta_R$$

That is, the algorithm 181 calculates the absolute pitch angle of the trailer $\theta_T$ by summing the absolute pitch angle of the tow vehicle $\theta_V$ with the relative pitch angle between the trailer and tow vehicle $\theta_R$ determined by the angle detection system 160.

In another example, the trailer leveling system 180 may communicate with a sensor 184 positioned on or within the trailer 104. The sensor 184 may be a smartphone with internal sensors that a user places on a floor, countertop, or other internally level surface of the trailer 104. The sensor 184 may measure the absolute pitch angles of the trailer $\theta_T$ and communicate that information to the vehicle controller 150 and the trailer leveling system 180.

The algorithm 181 of the trailer leveling system 180 also determines a length dimension $L_T$ of the trailer 104. The length $L_T$ extends between the tongue jack 182 and the center of the wheels 114 of the trailer 104. In one example, the length $L_T$ may be measured by a user and input to the user interface 140 of the tow vehicle 102. In another example, the trailer leveling system 180 assumes an average length $L_T$ which may be appropriate for most types of trailers.

In another example, the length $L_T$ is determined by the trailer leveling system 180 from images provided by the rear camera 136. The camera 136 may capture visual features that may be used to determine the length $L_T$ while the tow vehicle 102 and trailer 104 are driving with a non-zero relative yaw angle $\psi_R$. In one example, the trailer leveling system 180 may calculate the length $L_T$ from image features indicative of the trailer tongue jack 182 and trailer wheels 114 in combination with the relative yaw angle $\psi_R$. The trailer leveling system 180 may also determine the length $L_T$ by analyzing how fast the trailer 104 turns and/or how fast the trailer 104 returns to the zero-angle reference axis 168 after a turn. For example, a trailer 104 with a shorter length $L_T$ will straighten out and return to the zero-angle reference axis 168 faster than a trailer 104 with a longer length $L_T$. In other words, the travelled distance it takes for the trailer 104 to straighten out or converge to the zero-angle reference axis 168 after a turn correlates directly with trailer length $L_T$. This straightening distance may be determined by the trailer levelling system 180 using information provided by the sensors 118, 120, 134 and 138.

With the trailer absolute pitch angle $\theta_T$ and trailer length $L_T$ determined, the algorithm 181 then uses the following trigonometric formula to calculate the necessary trailer tongue height adjustment $H_P$:

$$H_P = \sin(\theta_T) * L_T$$

In other words, the trailer tongue height adjustment $H_P$ is calculated as the sine of the absolute trailer pitch angle $\theta_T$ multiplied by the trailer length $L_T$.

As illustrated in FIG. 4B, the trailer 104 may then be leveled in the pitch direction by positioning the trailer tongue 106 at a height $H_T$ equal to the sum of $H_W$ and $H_P$ from the angled surface 179b. The trailer tongue jack 182 can typically be extended to traverse the distance $H_W$. In one example, a user may stack additional material, such as boards or blocks of a known height, to support the trailer tongue jack 182 at the height $H_P$. In another example, the trailer tongue jack 182 may extend the full height $H_T$. In another example, the trailer levelling system 180 may display a warning on the user interface 140 if the trailer tongue jack 182 cannot extend the full height $H_T$ required to level the trailer 104 in the pitch direction. A user may then decide to move the trailer 104 to a more level location.

FIG. 5A illustrates a front view of the vehicle-trailer system 100 with trailer 104 on a third surface 179c angled in the transverse direction $X_T$. The tow vehicle 102 (not shown in FIG. 5A) is on a fourth surface 179d that is also angled in the transverse direction $X_T$. The tow vehicle 102 and trailer 104 form the relative roll angle $\varphi_R$.

The tow vehicle 102 has a vehicle absolute roll angle $\varphi_R$ on the angled surface 179d, which may be determined by the absolute angle sensor 122. The trailer 104 also has a trailer absolute roll angle $\varphi_T$ on the angled surface 179c.

Figure 5B:
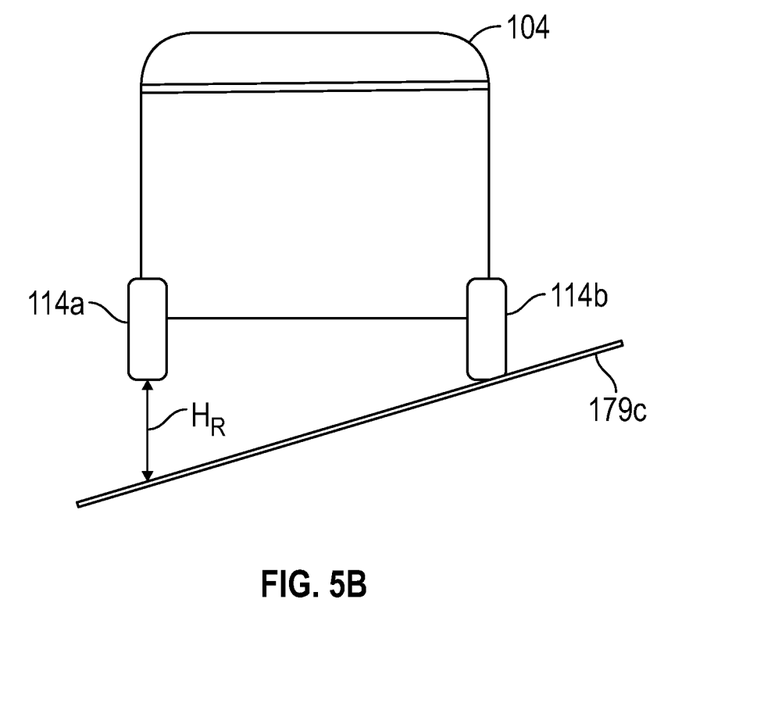
FIG. 5B is a schematic view of the trailer levelled on the angled surface of FIG. 5A.

The trailer leveling system 180 in this example determines a wheel height adjustment $H_R$ that must be achieved under one of the wheels 114 for the trailer 104 to be level in the roll direction (FIG. 5B).

In one example, to determine the height $H_R$, the algorithm 181 of the trailer leveling system 180 first uses the following equation to determine the trailer absolute roll angle $\varphi_T$:

$$\varphi_T = \varphi_V + \varphi_R$$

That is, the algorithm 181 calculates the absolute roll angle of the trailer $\varphi_T$ by summing the absolute roll angle of the tow vehicle $\varphi_V$ with the relative roll angle between the trailer and tow vehicle $\varphi_R$. In another example, the absolute roll angle of the trailer $\varphi_R$ may be measured by a sensor 184 positioned on or within the trailer 104.

The algorithm 181 of the trailer leveling system 180 also determines a width dimension $W_T$ of the trailer 104 that extends between the centers of left wheel 114a and right wheel 114b of the trailer 104. In one example, the width $W_T$ may be measured by a user and input to a user interface 140 of the tow vehicle 102. In another example, the trailer leveling system 180 assumes an average width $W_T$ which may be appropriate for most types of trailers. In another example, the width $W_T$ is determined by the trailer leveling system 180 from imaging provided by camera 36.

With the trailer absolute roll angle $\varphi_T$ and trailer width W determined, the algorithm 181 then uses the following trigonometric formula to calculate the necessary wheel height adjustment $H_R$:

$$H_R = \sin(\varphi_T) * W_T$$

In other words, the wheel height adjustment $H_R$ is calculated as the sine of the absolute trailer roll angle $\varphi_T$ multiplied by the trailer width W.

As illustrated in FIG. 5B, the trailer 104 may then be leveled in the roll direction by positioning a downhill wheel, in this example the left wheel 114a, at the height $H_R$ from the angled surface 179c. In one example, a user may stack material, such as boards or blocks of a known height, under the wheel 114a to achieved the height $H_R$.

It should be understood that although determining tongue height adjustment $H_P$ is discussed separately from wheel height adjustment $H_R$, the trailer leveling system 180 may determine both a tongue height adjustment $H_P$ and a wheel height adjustment $H_R$ if the trailer 104 is positioned on a surface slanted in both the fore-aft direction $Y_T$ and transverse direction $X_T$. In other words, the trailer leveling system 180 can determine height adjustments $H_P/H_R$ necessary to level the trailer 104 when both a non-zero pitch angle $\theta_T$ and roll angle $\varphi_T$ are present.

It should also be understood that the angles in FIGS. 4 and 5 are shown as quite large relative to what would likely be the case in practice for illustrative purposes. Further, the absolute angles of the tow vehicle $\theta_V/\varphi_V$ and trailer $\theta_T/\varphi_T$ are measured with reference to a horizontal plane 186 and are illustrated as positive angles in FIGS. 4 and 5. Trailer leveling system 180 can also accommodate a situation where one of the tow vehicle angle $\theta_V/\varphi_V$ and trailer angle $\theta_T/\varphi_T$ are negative relative to the other. For example, if the absolute angle of the tow vehicle $\theta_V/\varphi_V$ is negative relative to the horizontal plane 186, i.e. if the tow vehicle is on a downslope and the trailer is on an upslope, an absolute angle of the trailer $\theta_T/\varphi_T$ may still be determined by adding the negative value of the tow vehicle angle $\theta_V/\varphi_V$ to the relative angle $\theta_R/\varphi_R$.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, model-based design with auto-code generation, and/or in assembly/machine language. As used herein, the terms "machine-readable medium" and "computer-readable medium" refer to any computer program product, apparatus and/or device (e.g., magnetic discs, optical disks, memory, Programmable Logic Device's (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, device's, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   calculating, at a data processing hardware, a relative angle between a tow vehicle and a trailer attached to the tow vehicle;

determining, at the data processing hardware, an absolute angle of the tow vehicle;

calculating, at the data processing hardware, an absolute angle of the trailer based on the relative angle and the absolute angle of the tow vehicle;

determining, at the data processing hardware, a dimension of the trailer;

calculating, at the data processing hardware, a trailer leveling adjustment based on the absolute angle of the trailer and the dimension of the trailer; and sending, by the data processing hardware, at least one instruction to a user interface of the tow vehicle the trailer levelling adjustment;

wherein the relative angle comprises a relative pitch angle, the absolute angle of the tow vehicle comprises an absolute pitch angle of the tow vehicle, the absolute angle of the trailer comprises an absolute pitch angle of the trailer, the dimension comprises a trailer length, and the trailer levelling adjustment comprises a trailer tongue height adjustment.

2. The method of claim 1, wherein calculating the absolute angle of the trailer includes summing the relative angle and the absolute angle of the tow vehicle.

3. The method of claim 1, further comprising:

receiving, at the data processing hardware, images from a sensor positioned on a rear portion of the tow vehicle;

determining, at the data processing hardware, visual features from the images;

tracking, at the data processing hardware, the visual features while the tow vehicle and the trailer are moving; and wherein calculating the relative angle comprises calculating the relative angle based on the visual features.

4. The method of claim 3, wherein determining the dimension comprises determining the dimension based on the visual features.

5. The method of claim 1, wherein determining the dimension is based on an input by a user to a user interface of the tow vehicle.

6. The method of claim 1, wherein the trailer tongue height adjustment, $H_P$, is calculated as:

$$H_P = \sin(\theta_T) * L_T,$$

wherein $\theta_T$ is the absolute pitch angle of the trailer and $L_T$ is the trailer length.

7. The method of claim 1, wherein:

the relative angle further comprises a relative roll angle;

the absolute angle of the tow vehicle further comprises an absolute roll angle of the tow vehicle;

the absolute angle of the trailer further comprises an absolute roll angle of the trailer;

the dimension further comprises a trailer width; and the trailer leveling adjustment further comprises a wheel height adjustment.

8. The method of claim 7, wherein the wheel height adjustment, $H_R$, is calculated as:

$$H_R = \sin(\varphi_T) * W_T,$$

wherein $\varphi_T$ is the absolute roll angle of the trailer and $W_T$ is the trailer width.

9. The method of claim 1, further comprising adjusting, by the data processing hardware, a height under the trailer based on the trailer leveling adjustment.

10. A system for determining a trailer leveling adjustment of a trailer comprising:

a sensor;

data processing hardware in communication with the sensor and configured to: p1 calculate a relative angle between the tow vehicle and the trailer, the tow vehicle attached to the trailer;

determine an absolute angle of the tow vehicle;

calculate an absolute angle of a trailer based on data obtained by the sensor and the absolute angle of the tow vehicle;

determine a dimension of the trailer;

calculate a trailer leveling adjustment based on the absolute angle of the trailer, the absolute angle of the tow vehicle, and the dimension of the trailer; and display the trailer levelling adjustment on a user interface of a tow vehicle associated with the trailer, wherein the relative angle comprises a relative roll angle, the absolute angle of the tow vehicle comprises an absolute roll angle of the tow vehicle, the absolute angle of the trailer comprises an absolute roll angle of the trailer, the dimension comprises a trailer width, and the trailer levelling adjustment comprises a wheel height adjustment.

11. The system of claim 10, wherein the sensor comprises an imaging sensor mounted to an aft structure of the tow vehicle.

12. The system of claim 11, wherein the data processing hardware is further configured to:

receive images from the imaging sensor;

determine visual features from the images;

track the visual features while the tow vehicle and trailer are moving; and calculate the relative angle based on the visual features.

13. The system of claim 12, wherein the data processing hardware determines the dimension based on the visual features.

14. The system of claim 10, wherein the data processing hardware determines the dimension of the trailer based on an input by a user.

15. The system of claim 10, wherein the sensor comprises a smart phone positioned within the trailer.

16. The system of claim 10, wherein the relative angle further comprises a relative pitch angle, the absolute angle of the tow vehicle further comprises an absolute pitch angle of the tow vehicle, the absolute angle of the trailer further comprises an absolute pitch angle of the trailer, the dimension further comprises a trailer length, and the trailer levelling adjustment further comprises a trailer tongue height adjustment.

17. The system of claim 16, wherein the trailer tongue height adjustment, $H_P$, is calculated as:

$$H_P = \sin(\theta_T) * L_T,$$

wherein $\theta_T$ is the absolute pitch angle of the trailer and $L_T$ is the trailer length.

18. The system of claim 10, further comprising adjusting a height under the trailer based on the trailer levelling adjustment.

19. The system of claim 10, wherein the wheel height adjustment, $H_R$, is calculated as:

$$H_R = \sin(\varphi_T) * W_T,$$

wherein $\varphi_T$ is the absolute roll angle of the trailer and $W_T$ is the trailer width.

20. A non-transitory computer readable medium including instructions executable by a data processing hardware, the instructions comprising:
- instructions executed by the data processing hardware for calculating a relative angle between a tow vehicle and a trailer attached to the tow vehicle;
- instructions executed by the data processing hardware for determining an absolute angle of the tow vehicle;
- instructions executed by the data processing hardware for calculating an absolute angle of the trailer based on the relative angle and the absolute angle;
- instructions executed by the data processing hardware for estimating a dimension of the trailer;
- instructions executed by the data processing hardware for calculating a trailer levelling adjustment based on the absolute angle of the trailer and the dimension of the trailer; and
- instructions executed by the data processing hardware for causing a user interface of the tow vehicle to display the trailer levelling adjustment,
- wherein at least one of 1) the relative angle comprises a relative pitch angle, the absolute angle of the tow vehicle comprises an absolute pitch angle of the tow vehicle, the absolute angle of the trailer comprises an absolute pitch angle of the trailer, the dimension comprises a trailer length, and the trailer levelling adjustment comprises a trailer tongue height adjustment; or 2) the relative angle comprises a relative roll angle, the absolute angle of the tow vehicle comprises an absolute roll angle of the tow vehicle, the absolute angle of the trailer comprises an absolute roll angle of the trailer; the dimension comprises a trailer width; and the trailer levelling adjustment comprises a wheel height adjustment.

21. The non-transitory computer readable medium as recited in claim 16, wherein the trailer tongue height adjustment, $H_P$, is calculated as:

$$H_P = \sin(\theta_T) * L_T,$$

wherein $\theta_T$ is the absolute pitch angle of the trailer and $L_T$ is the trailer length.

22. The non-transitory computer readable medium as recited in claim 16, wherein the wheel height adjustment, $H_R$, is calculated as:

$$H_R = \sin(\varphi_T) * W_T,$$

where $\varphi_T$ is the absolute roll angle of the trailer and $W_T$ is the trailer width.

* * * * *